United States Patent [19]

Milhous et al.

[11] 3,998,124
[45] Dec. 21, 1976

[54] BOMB RACK ARMING UNIT

[75] Inventors: Thomas E. Milhous, Warminster; William J. Halpern, Langhorne, both of Pa.

[73] Assignee: The United States of America as represented by the Secretary of the Navy, Washington, D.C.

[22] Filed: June 2, 1975

[21] Appl. No.: 583,344

[52] U.S. Cl. .................................. 89/1.5 D; 102/2
[51] Int. Cl.² ........................................ F41F 5/02
[58] Field of Search ............ 89/1.5 D, 1.5 R, 1.812; 102/2; 294/83 A, 83 AA

[56] References Cited
UNITED STATES PATENTS

| | | | |
|---|---|---|---|
| 1,643,468 | 9/1927 | Paulus | 89/1.5 D |
| 2,341,457 | 2/1944 | Markey et al. | 89/1.5 D |
| 2,922,340 | 1/1960 | Wilkie | 89/1.5 D |
| 2,992,594 | 7/1961 | Anderson et al. | 89/1.5 D |
| 3,200,707 | 8/1965 | West | 89/1.5 D |
| 3,476,012 | 11/1969 | Jackson | 89/1.5 D |
| 3,703,844 | 11/1972 | Bleikamp | 89/1.5 D |

*Primary Examiner*—David H. Brown
*Attorney, Agent, or Firm*—R. S. Sciascia; Henry Hansen; Robert J. Mooney

[57] ABSTRACT

A solenoid operated arming unit under the control of an aircraft pilot which allows the pilot to selectively eject an armed or unarmed weapon at his discretion. To release an armed weapon, the solenoid is energized to thereby lock opposed jaws about a ball and arming wire assembly; as the weapon falls away from the aircraft, the immobilized arming wire assembly pulls free of the weapon fuze to thereby arm the weapon. To release an unarmed weapon, the solenoid is not energized; as the weapon falls away from the aircraft, the ball and arming wire assembly is pulled free from the arming unit retaining jaws and remains attached to the weapon fuze.

The arming unit is configured to eliminate deleterious arming unit preloading and is so constructed that the arming wire assembly may be jettisoned after an armed weapon is dropped to thereby prevent damage to the aircraft from arming wire assemblies which flail in the aircraft's windstream.

4 Claims, 7 Drawing Figures

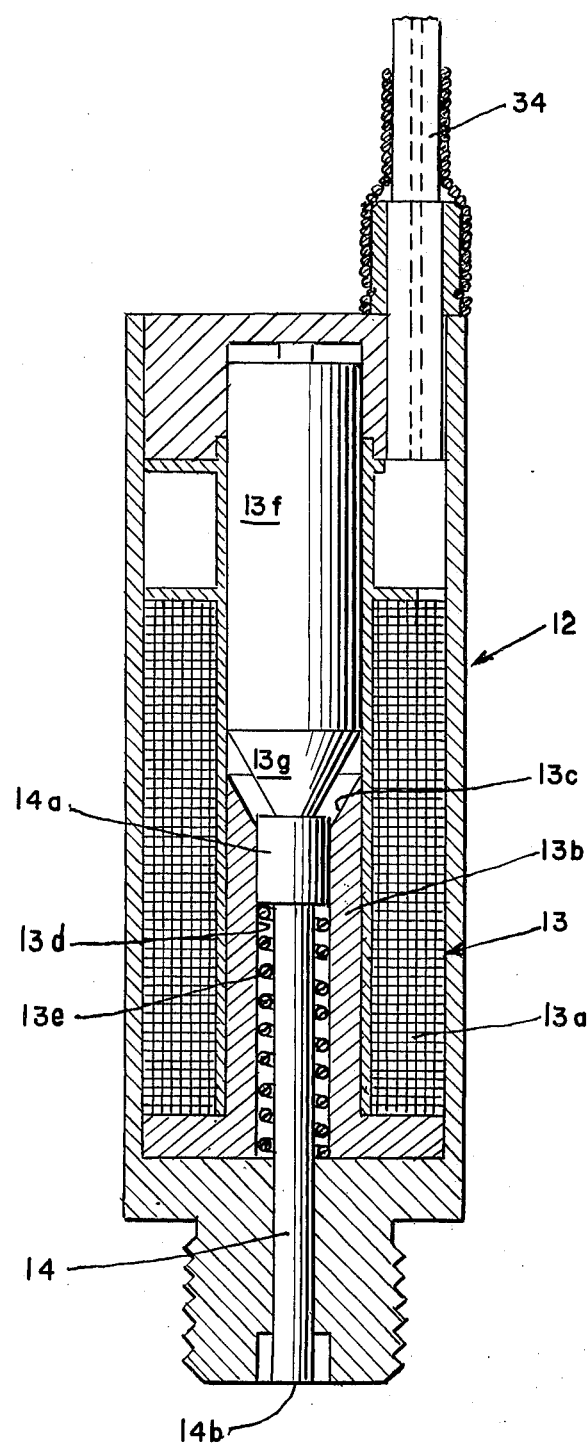

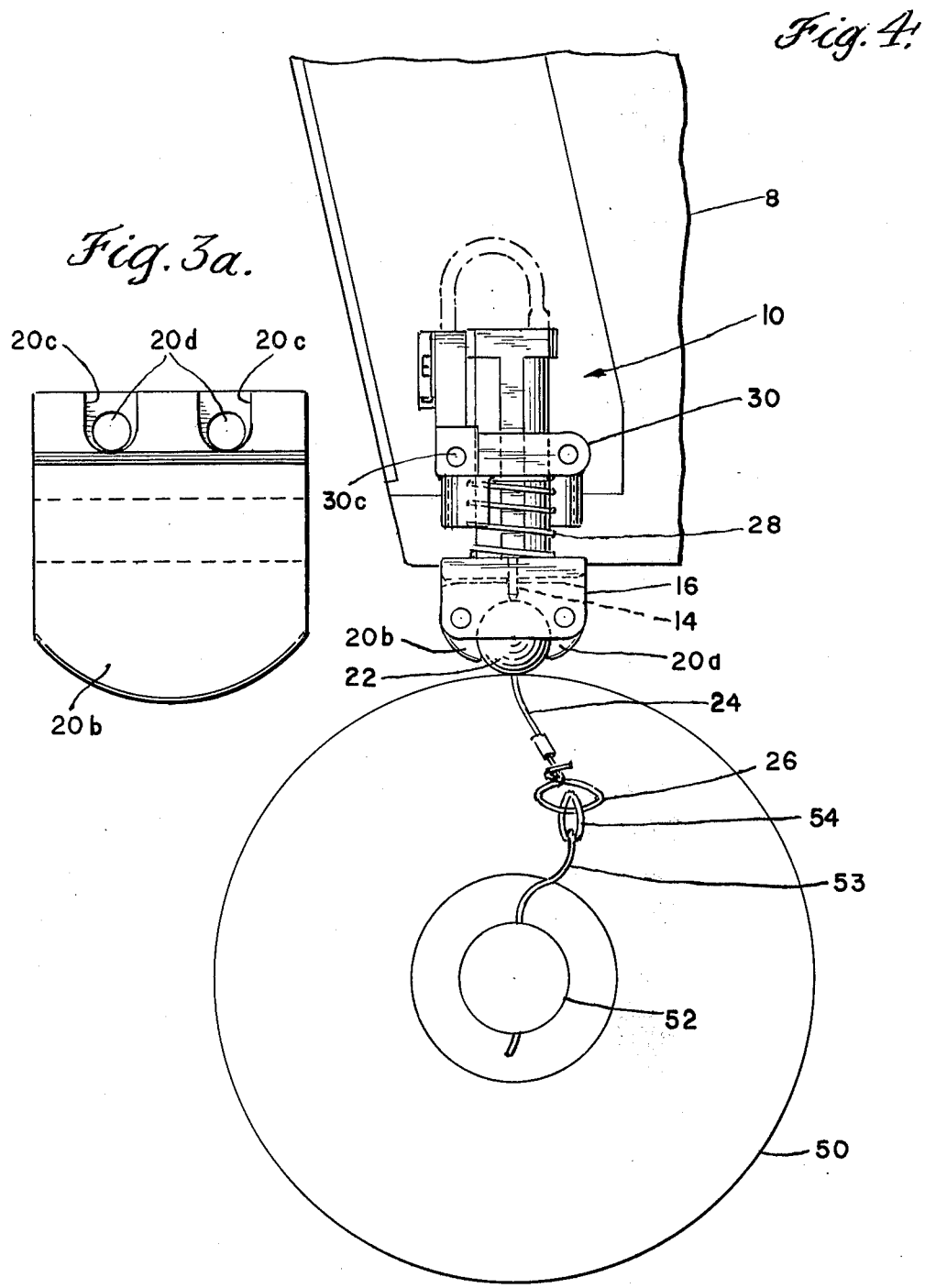

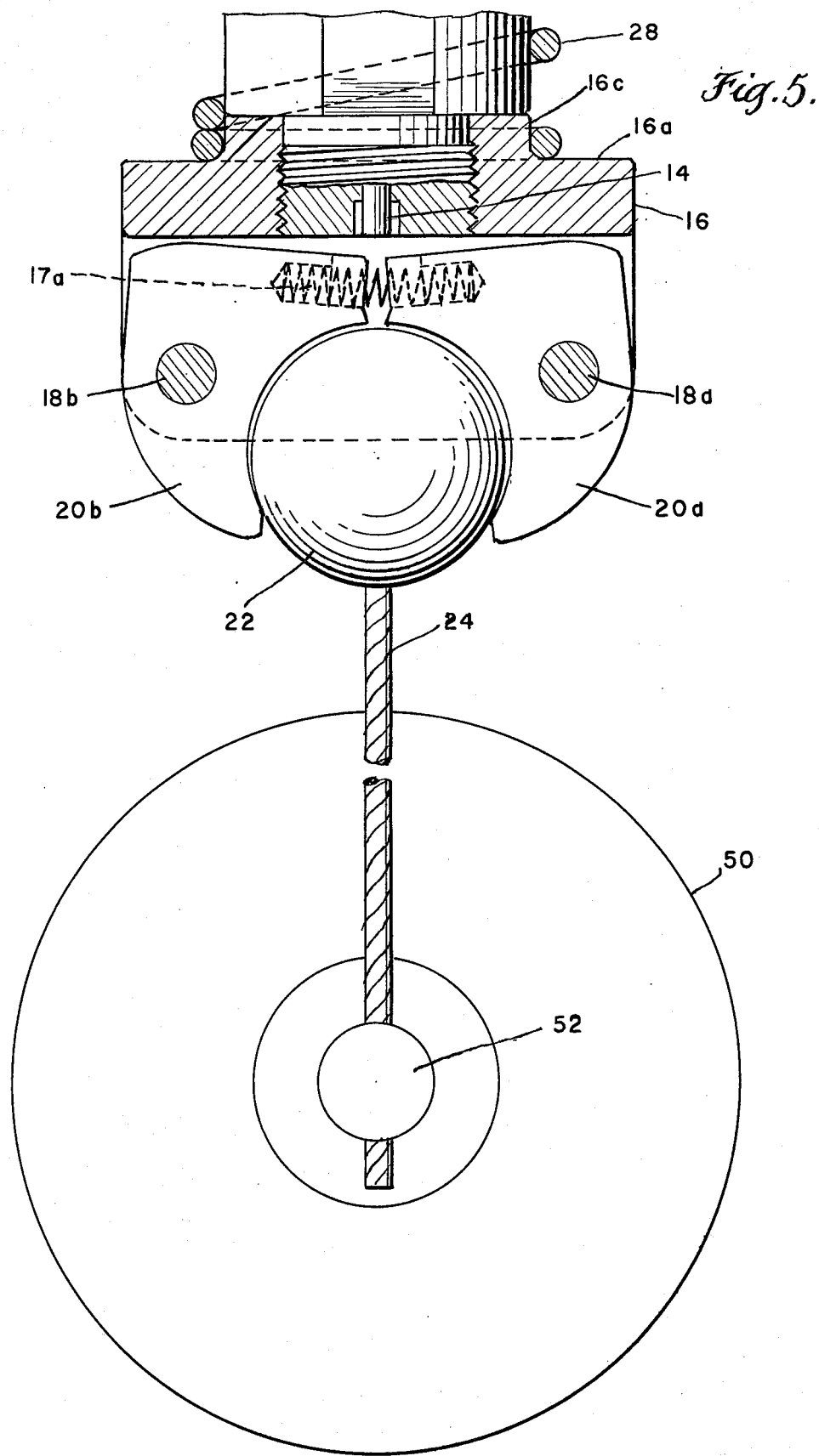

BOMB RACK ARMING UNIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an improved arming unit and more particularly to an arming unit which positively retains the arming wire within the arming unit to thereby prevent arming unit preloading and which also incorporates an arming wire self-cleaning feature.

In the utilization of ordnance stores such as bombs and rockets it is highly desirable to provide means by which the store may be rendered completely safe and not subject to accidental ignition. This is generally accomplished by providing an arming device which when energized operates to orient the parts of the fuze and the explosive portion of the missile only at a time determined by the requirements of the situation, preferably immediately prior to the release of a missile during an attack. If the missile is armed substantially prior to its utilization, a substantial danger exists that the missile will be accidentally fired or ignited; this condition would be extremely hazardous to the personnel handling the ordnance apparatus and the crew of the aircraft. Use of permanently armed missiles would also greatly complicate the care required in handling and storing explosive missiles.

It is desirable, therefore, to employ a device which selectively controls the arming of explosive missiles so that bombs carried beneath an aircraft may have an arming wire extended therefrom which is retained in fixed relationship to the aircraft. Thereby, upon release of the missile, the arming wire is withdrawn from the missile fuze placing the various parts thereof in condition for firing at the critical time or under the critical conditions of impact or proximity.

Furthermore, it is desirable that such arming apparatus be capable of remote control by a pilot, or the like, to selectively release the arming wire, permitting the discharge of a missile in an emergency without conditioning the various parts thereof for firing. For example, it is sometimes desirable or necessary to discharge missiles while over friendly territory or a portion of an airfield.

Arming units are electromechanical solenoid actuated devices which determine whether a conventional fuzed weapon will be dropped in an unarmed (safe) condition or in an armed condition. Arming units are adapted to be secured to a bomb rack or weapon suspension equipment which is located, for example, on the underside of an aircraft wing.

A widely used prior art arming unit comprises a solenoid actuated electromechanical device which is contained within an aircraft's weapon suspension equipment and which is used to arm or safe the mechanical fuzing of conventional weapons. A suspended weapon is prepared for functioning by inserting an arming wire's swivel loop into the arming unit's restrictive slot and by attaching the other wire end to the weapon's mechanical fuze and restraining frictional safety clip. The weapon may be armed by energizing the arming unit's 28 volt DC solenoid to retain the swivel loop within the arming unit and ultimately pull the arming wire out of the safety clip and fuze at the time when the weapon is separated from the aircraft. A weapon is released in the unarmed (safe) condition by not energizing the arming unit which permits the unretained arming wire to drop with the weapon and its associated fuze and safety clip.

With the relatively low speeds of 1940 vintage aircraft arming units with arming wire holding forces of two pounds and release forces of eight pounds were adequate for intended service. However, high performance aircraft used in current service create air turbulences and high arming wire airloads in excess of the holding forces for which these units were intended. Consequently the holding forces were increased to a range of ten to twelve pounds.

Even with the increase in arming wire holding forces an undesirably large number of arming units were observed to function improperly, i.e., an unarmed weapon was dropped when it was intended to drop an armed weapon. Prior art arming unit malfunctions were found to be caused by a variety of factors, such as:

a. preloading of the arming wires by aerodynamic loading, tight arming wire rigging or both;

b. camming of the arming wire swivel loops in the arming unit slot;

c. side loading of the arming wire caused by off-centerline arming wire routing, rolling of the weapon upon its release, non-vertical release of the weapon or combinations of these;

d. the difficulty of maintaining a safe jettison force range under fleet operational conditions; and e. arming unit housing failures which occur during normal operations.

In addition, the relatively high safe jettison release force (8–10 pounds) which the prior art arming unit exhibits allows the undesirable retention of the arming wire after an armed weapon has been released. Retained arming wires flail about in the aircraft's windstream causing damage to the aircraft wings and appendages.

SUMMARY OF THE INVENTION

Accordingly it is an object of this invention to provide an arming unit which enables a pilot to selectively drop an armed or unarmed weapon in his discretion. It is a further object of this invention to provide an arming unit wherein the arming wire is positively retained within the arming unit by means of an interface force generated by the interaction of a compressible portion of the arming unit and a portion of a weapon's surface to thereby eliminate arming unit preloading and the deleterious effects thereof. It is a further object of this invention to provide an arming unit with a relatively low arming wire holding force to thereby facilitate the release of the arming wire after an armed weapon has been dropped. These and other objects are achieved as follows.

A flanged solenoid housing is securely attached to a jaw housing having two opposed jaws pivotally mounted therein. The jaw faces are concavely shaped to receive and retain a swaged ball having an arming wire assembly depending therefrom. A compression spring surrounds the solenoid housing, the lower end of which abuts the upper side of the jaw housing and the upper end of which abuts the underside of an apertured reaction plate. The reaction plate is apertured to permit relative sliding motion of the solenoid housing with respect to the reaction plate. Solenoid power supply lines extend from the solenoid housing through a flexible cable to a terminal carried by the reaction plate. The apertured reaction plate is fixedly secured to the aircraft's bomb rack in a manner to assure that the compression spring is placed under load when a weapon is suspended from the bomb rack's suspension hook.

In the absence of contact between the weapon surface and the ball, the ball is held between the jaws of the arming unit by a one half to one pound force generated by two parallel reaction springs which interconnect the jaws at points above their respective pivot axes. In the presence of contact between the weapon surface and the ball, the ball is held between the jaws not only by the nominal force generated by the reaction springs but also by the greater than ten pound force generated by the now compressed compression spring.

Further features and advantages of the invention will become apparent from the following detailed description and the accompanying drawings.

BRIEF DESCRIPTION OF THE DRAWINGS

FIG. 1a is a partial cross-sectional view of a portion of the arming unit, shown in FIG. 1, which shows a solenoid apparatus;

FIG. 3a is a detailed view of an arming unit jaw face;

FIG. 4 is a detailed view of the arming unit in relationship to a fully suspended weapon; and FIG. 5 is a partially sectioned view of the arming unit jaw housing which shows the deleterious effects of preloading.

DESCRIPTION OF THE PREFERRED EMBODIMENT

Figure 1:
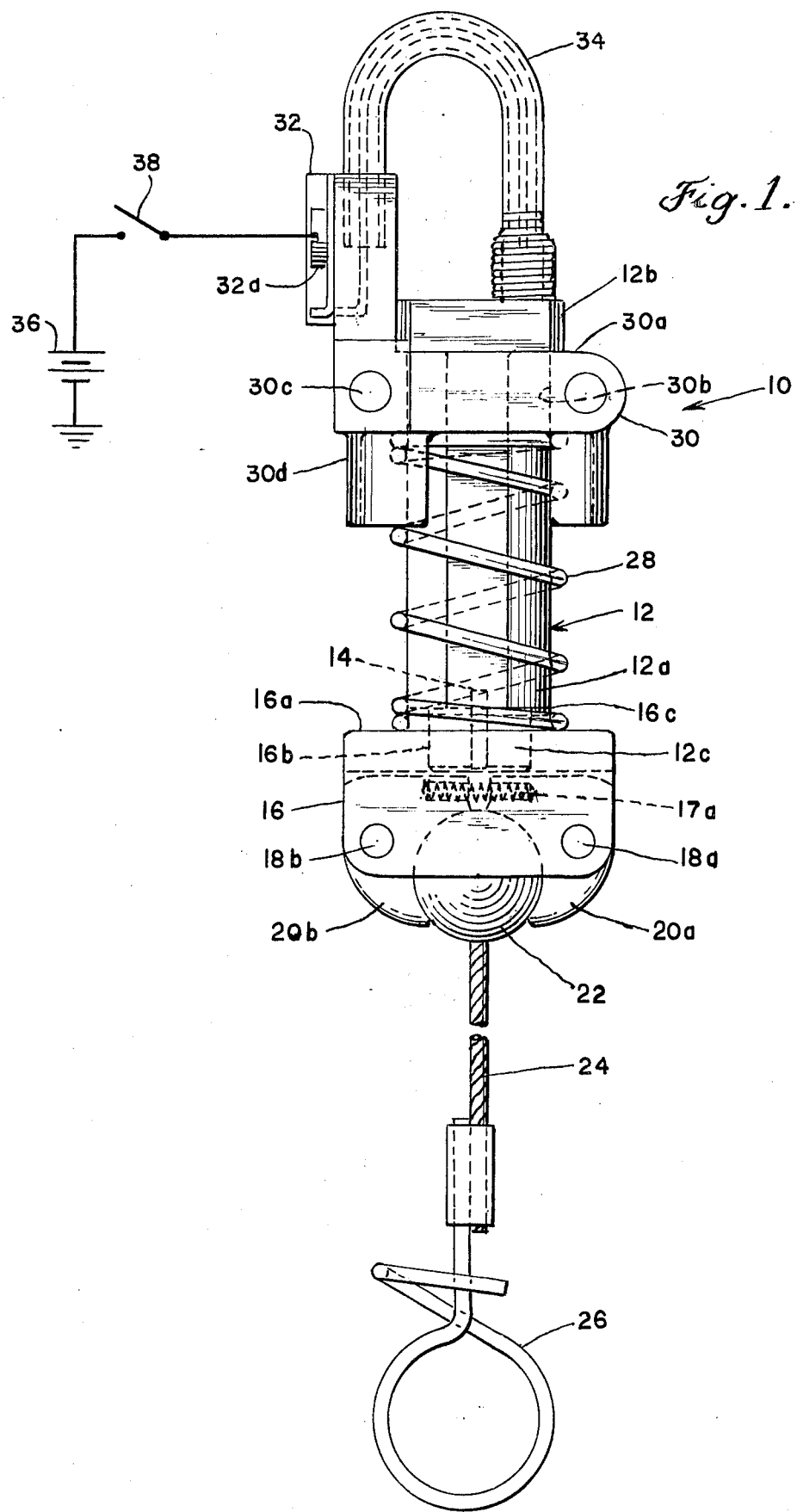
FIG. 1 is a plan view of an arming unit in accordance with the present invention.

Referring to FIG. 1, an overall view of an arming unit 10, constructed in accordance with the principles of this invention, is shown. The arming unit 10 includes a metallic solenoid housing 12 having a generally cylindrical and elongated central portion 12a fixedly secured to an enlarged diameter flange 12b at one end and to a reduced diameter stub 12c at the other end. The solenoid housing 12 contains a conventional solenoid apparatus 13 (FIG. 1a) which controls the movement of a solenoid plunger 14 which is metallic. The plunger 14 moves rectilinearly along the vertical axis of the solenoid housing 12 from a retracted position when the solenoid is not activated to an extended position when the solenoid is activated.

At its stub end 12c, the solenoid housing 12 is threadably secured to a channel-shaped metallic jaw housing 16. The upper side 16a of the jaw housing 16 contains a collared bore 16b for receiving the stub end 12c of the solenoid housing 12. The jaw housing 16 contains two parallel spatially fixed metallic pivot pins 18a, 18b which support movable jaws 20a and 20b respectively. The metallic jaws 20a, 20b are employed to retain a metallic ball 22 with a nominal holding force of one half to one pound. The ball 22 is secured to an arming wire 24 which is secured to a snap link 26. As will be explained more fully hereinafter, the pivotable jaws 20a, 20b are interlinked by two parallel reaction springs 17a, 17b.

The central portion 12a of the solenoid housing 12 is surrounded by a metallic compression spring 28, the lower end of which fits over the collar 16c on the upper side 16a of the jaw housing 16 and the upper end of which abuts the underside of a reaction plate 30. The upper side 30a of the reaction plate 30 abuts the underside of the solenoid housing flange 12b when the spring 28 is uncompressed. The reaction plate 30 has a bore 30b therethrough which accommodates the central portion of the solenoid housing 12a and which permits the solenoid housing 12 to move relative to the normally spatially fixed reaction plate 30. In practice, the reaction plate 30 is securely fixed to an aircraft bomb rack with lugs 30c as shown in FIG. 4. The reaction plate 30 carries a terminal assembly 32 fabricated from a non-conducting material which supports a pair of terminal lugs 32a, only one of which is shown in the figures. The terminal assembly 32 is securely integrated with one end of a flexible electrical cable 34 which extends from the terminal assembly 32 to the upper side of the flange 12b where it is connected with the electrical leads of the solenoid apparatus 13 disposed within the solenoid housing 12. A power supply 36, located on the aircraft, supplies power to the solenoid apparatus 13 via a manually operable switch 38 which is under the control of the aircraft pilot.

The reaction plate 30 also includes an annular downwardly depending skirt 30d. The skirt 30d serves as a stop to limit the upward travel of the solenoid housing 12 to thereby prevent damage to the compression spring 28 due to inadvertent overtravel of the solenoid housing 12.

FIG. 1a is a partial cross-sectional view of the solenoid housing 12 which reveals the solenoid 13 disposed therein. The conventional push solenoid 13 includes a coil 13a electrically connected to the flexible cable 34. The coil 13a encircles an armature stop 13b having a conical recess 13c at the upper end thereof. The stop 13b has a longitudinal bore 13d therethrough in which the plunger 14 is situated for sliding motion. A bias spring 13e encircles a portion of the plunger 14 and abuts an interior surface of the solenoid housing 12 and an enlarged diameter portion 14a of the plunger 14. An armature 13f, having a tapered end 13g which abuts the enlarged portion 14a of the plunger 14, is slidably disposed in the upper portion of the solenoid housing 12.

When the coil 13a is energized, the armature 13f is drawn downwardly and overcomes the counterforce of the bias spring 13e to thereby move the plunger end 14b a predetermined distance out of the solenoid housing 12. When the coil 13a is not energized, the bias spring 13e urges the plunger 14 and armature 13f to the position shown in FIG. 1a.

To better withstand the jaw forces, the plunger 14 is peferably fabricated from a high strength alloy such as MP35N.

Figure 2:
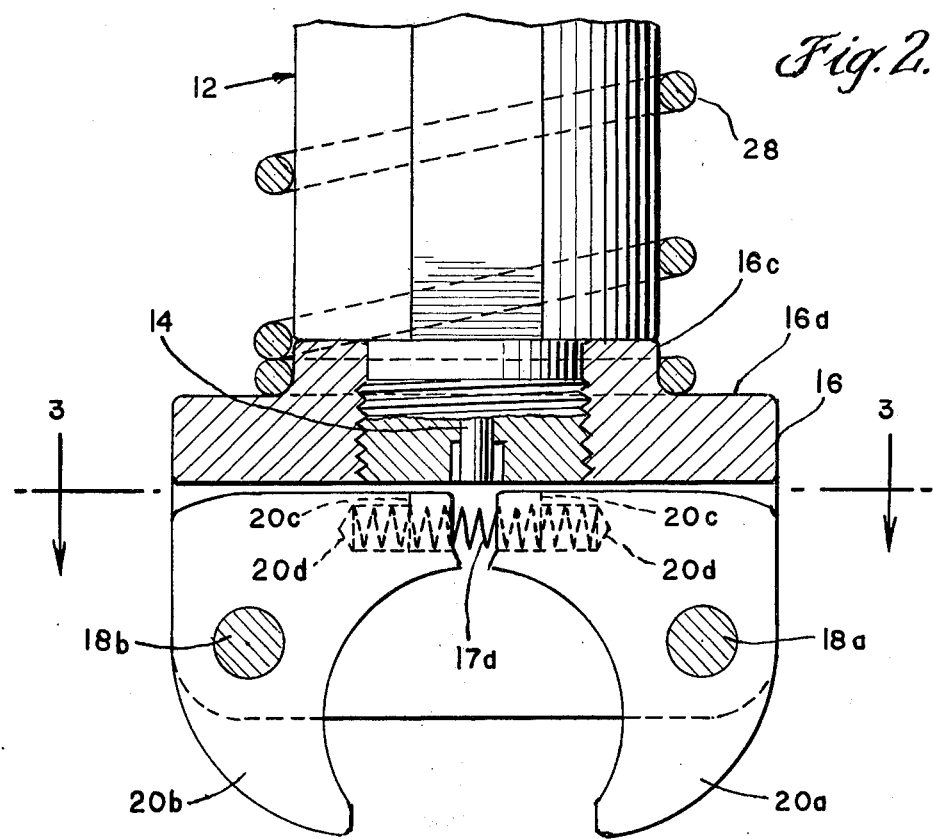
FIG. 2 is a partially vertically sectioned view of a portion of the arming unit shown in FIG. 1.
Figure 3:
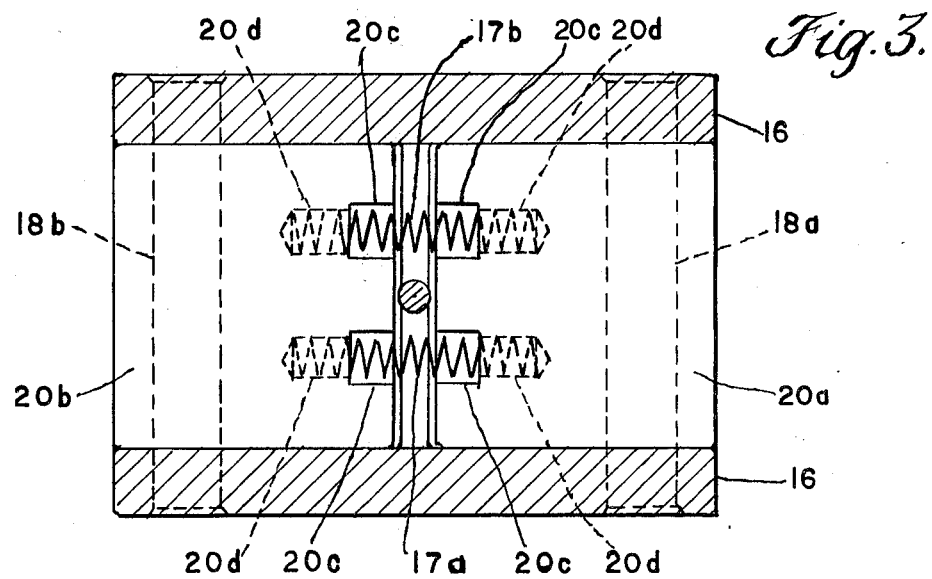
FIG. 3 is a horizontal section along the lines 3—3 of the view in FIG. 2.

FIGS. 2, 3 and 3a present detailed views of the jaw housing 16, the jaws 20a, 20b, the reaction springs 17a, 17b, the plunger 14 and the special spatial relationships among the foregoing elements. In FIG. 2, the solenoid plunger 14 is shown in the retracted position where it does not interfere with the pivoting motions of the jaws 20a, 20b about their respective pivot pins 18a, 18b. At their respective upper surfaces the jaws 20a, 20b are separated by a distance slightly greater than the diameter of the solenoid plunger 14. This is best seen in FIG. 3 where, for clarity of presentation, the plunger 14 is shown in its extended position. In the extended position, the plunger 14 is located between the jaws 20a, 20b and between the reaction springs 17a, 17b.

As best seen in FIGS. 3 and 3a, each of the upper surfaces of the jaws 20a, 20b are provided with an open topped channel 20c having a communicating spring holding bore 20d adjacent thereto. The spring holding bores 20d secure the ends of the reaction springs 17a, 17b to the jaws 20a, 20b. The reaction springs 17a, 17b bias the jaws 20a, 20b to the position shown in FIGS. 1, 2, 3 and 4 in the absence of other forces on the jaws 20a, 20b. The open topped channels 20c allow jaw 20a and jaw 20b to pivot in the counterclockwise and clockwise direction respectively without unduly binding the reaction springs 17a, 17b.

FIG. 4 illustrates the correct relationship between a suspended fuzed weapon 50, such as a bomb, and the arming unit 10. The weapon 50 is suspended in a conventional manner from a hook (not shown) secured to an aircraft's bomb rack 8. The arming unit 10 is also secured to the bomb rack 8 in such manner that when the weapon 50 is suspended from the hook (not shown) the surface of the weapon engages the surface of the ball 22. Since the effective distance from the hook's weapon support point to the weapon's surface is less than the extended length of the compression spring 28 (see FIG. 1), the fully suspended weapon 50 exerts a force on the ball 22 which is transmitted through the jaws 20a, 20b and jaw housing 16 to thereby compress the compression spring 28 between the upper side of the jaw housing 16a and the underside of the reaction plate 30. Hence when the weapon 50 is completely suspended, the compression spring 28 exerts a substantially vertically directed force on the ball 22 and the weapon 50 surface interface. The interface force generated by the compression spring 28 is greater than 10 pounds. Consequently the ball 22 is firmly seated between the jaws 20a and 20b and the jaws 20a, 20b cannot pivot about their respective pivot pins 18a, 18b. Hence preloading of the arming unit during flight is prevented.

Prevention of arming unit 10 preloading is an important aspect of this invention and also represents an important improvement over prior art arming units. Preloading is caused by tight rigging procedures (as well as aerodynamic forces during flight) which place an undesirably large tensile force on the arming wire 24. An example of the effects of preloading on the arming unit of the present invention is shown in FIG. 5 where for purposes of illustration the weapon 50 is assumed not to be in contact with the ball 22 when the weapon is completely suspended. (It should be noted here that the situation illustrated in FIG. 5 is analogous to the situation to be found in presently employed prior art arming units, i.e., the weapon 50 does not intimately, positively and forcefully contact the arming unit when suspended from the weapon hook.) In FIG. 5, it is assumed that ground personnel have unintentionally but unduly tensioned the connection between the arming wire 24 and the ball 22.

If, in a first case, it is assumed that the holding force of the jaws 20a, 20b with the plunger 14 retracted is large enough to overcome the tension on the arming wire 24, the arming unit would be preloaded and the jaws 20a, 20b would tend to cant as shown in FIG. 5. Hence the separation between the upper surfaces of the jaws 20a, 20b would be decreased to such an extent that the plunger 14 would no longer be urged between the jaws 20a, 20b when the solenoid 12 is activated. If, in a second case, it is assumed that the holding force of the jaws 20a, 20b is insufficient to overcome the tension in the arming wire 24 and/or aerodynamic forces acting on the arming unit, the ball 22 will be pulled free of the jaws 20a, 20b. In either of these cases, an unarmed weapon 50 will be dropped when it was intended that an armed weapon 50 should be dropped. Hence it is clear from the foregoing that arming unit preloading is to be avoided.

ARMING UNIT OPERATION

In what follows it has been assumed that the arming unit 10 has been secured to the weapon pod 8 with the lugs 30c.

The swaged ball 22 with attached arming wire 24 is inserted between the jaws 20a, 20b of the arming unit 10 and retained therebetween by a one half pound to one pound force developed by the two reaction springs 17a, 17b which interconnect the jaws 20a, 20b. Before the weapon 50 is suspended from the bomb rack hook (not shown) the weapon 50 is prepared for proper functioning by the installation of a mechanical fuze 52 in the weapon nose and by inserting any one of the many currently used fuze wire 53 configurations through the fuze 52 and ultimately into one or several of the many fuze safety clip configurations (not shown). The swivel end 54 of the fuze wire 53 is interconnected with the snap link 26 of the arming wire 24 after the weapon 50 is attached to the hook (not shown) of the bomb rack 8. Interlinking the fuze wire 53 with the arming wire 24 after the weapon is completely suspended from the bomb rack hook assures that no tension forces will be placed on the arming wire 24 before the weapon is suspended from the bomb rack hook (not shown). When the weapon 50 is completely suspended from the bomb rack hook (not shown) the ball 22 is securely maintained between the jaws 20a, 20b of the arming unit 10 by the force generated by the compression spring 28 as hereinbefore explained. See FIG. 4. During aircraft flight this greater than ten pound vertical interface force will prevent arming unit 10 preloading by aerodynamic and/or tight arming wire rigging procedures. That is, the jaws 20a, 20b will not be able to pivot within the jaw housing since the ball 22 is securely maintained between the jaws 20a, 20b by the vertical interface force.

To release an armed weapon the arming unit 10 is energized by the nominal 28 volt DC power supply 36 through the manually controlled switch 38 via electrical lines from the cockpit through the suspension equipment to the arming unit terminal 32a and on through the flexible arming unit cable 34 to the solenoid 13 located within the solenoid housing 12. (See FIG. 1.) The energized push solenoid 13 extends its plunger 14 between the jaws 20a and 20b as shown in FIGS. 3 and 4. Thus, with the solenoid activated and the plunger 14 located between the jaws 20a and 20b, the ball 22 is positively retained because the jaws 20a, 20b cannot pivot. The jaws 20a, 20b, with the plunger 14 therebetween, will withstand a vertical release force of up to 200 pounds. Upon weapon 50 release the locked arming unit 10 follows the weapon 50 through the full arming unit stroke and, at weapon separation the locked arming unit 10 retains the ball 22 and arming wire assembly to thereby arm the weapon by withdrawing the fuze wire 53 from the fuze 52 and fuze safety clips. (The interlinked arming wire 24 and fuze wire 53 are collectively referred to herein as the arming wire assembly.)

Since the arming unit interfaces with a ball 22, the arming wire 24 may be rigged by as much as approximately 50° off the vertical axis without deleterious effects. This 50° downwardly directed cone of arming wire 24 pull capability compensates for weapon off-center line routing, rolling of weapon at launch, non-vertical ejection of weapons or any combination of these.

After the weapon 50 has been dropped, the energized arming unit 10 maintains the ball 22, with the attached arming wire assembly, between the jaws 20a, 20b. The arming wire assembly, which may be as long as five feet, flails about in the airstream and can possibly damage the aircraft. Thus, immediately after the weapon 50 has been released, the solenoid is de-energized to thereby withdraw the plunger 14 from between the jaws 20a and 20b. Since the jaws are then held in the position shown in FIG. 1 only by the reaction springs 17a, 17b, aerodynamic forces overcome the one half pound to one pound force of the reaction springs 17a, 17b and pull the ball 22 with the attached arming wire assembly from between the jaws 17a, 17b.

To release a safe or unarmed weapon 50 the arming unit 10 is not energized and upon weapon separation from the bomb rack suspension hook (not shown) the jaws 20a, 20b freely open against the greater than one pound arming wire assembly load supplied by the fuze 52 and safety clips. Failure of the arming unit 10 to retain the ball 22 permits weapon retention of the arming wire assembly which causes an unarmed weapon to be dropped.

It should be noted here that the arming wire 24 is intentionally designed to be a weak link failure point. It is designed to fail at a load less than the structural strength of the arming unit 10 assembly. Thus, should arming forces be generated that are greater than the arming wire 24 load limit, the arming wire 24 failure will result in a safe weapon release and undamaged arming unit 10 assembly. The arming unit 10 fails at approximately 250 pounds and the arming wire 24 fails at approximately 200 pounds.

From the foregoing it should be clear that an improved arming unit configuration has been provided. Positive retention of the ball 22 and arming wire assembly during flight precludes unintended safe weapon releases due to arming unit preloading. A near zero arming unit safe jettison force assures reliability in the safe release mode independent of other less reliable arming unit systems. The arming unit self-cleaning feature releases the ball 22 and arming wire assembly after an armed weapon 50 release to eliminate potential aircraft damage due to flailing arming and fuze wires. Unnoticed arming unit damage or failure, which could result in repetitive malfunctioning of the arming unit, are obviated by the shear link feature of the arming wire 24.

Obviously many modifications and variations of the present invention are possible in the light of the above teachings. It is therefore to be understood that within the scope of the appended claims the invention may be practiced otherwise than as specifically described.

We claim:

1. An arming unit, for selectively retaining or releasing an arming wire ball, comprising:
   a jaw housing;
   a pair of juxtaposed jaws pivotally mounted within said jaw housing;
   bias means interconnecting said jaws for urging said jaws toward a ball retaining position;
   a reaction plate having an aperture therethrough;
   a cylindrical casing extending through said aperture, having a lower end secured to said jaw housing and having an upper end provided with an enlarged diameter flange;
   a compression spring circumposed about said casing, said spring having a lower end which abuts the upper side of the jaw housing and an upper end which abuts the lower side of said reaction plate, said spring normally urging said cylindrical casing flange into abutment with the upper side of said reaction plate;
   a plunger disposed within the lower end of said casing for movement between a retracted position wherein said plunger is positioned within the casing and an extended position wherein said plunger is positioned between said jaws; and
   a solenoid disposed within said casing and operatively connected to said plunger to move said plunger between the retracted position and the extended position.

2. An arming unit adapted for use with a fuzed weapon, which is suspended from an aircraft weapon rack and subsequently released therefrom, to selectively determine the armed or unarmed state of the released weapon, comprising:
   an arming wire ball;
   an arming wire having one end fixedly secured to said ball and the other end formed to be inserted into the fuze of the suspended weapon;
   grasping means for releasably retaining said ball, said grasping means formed to be placed in a first condition wherein said ball is retained by said grasping means when the weapon is released and to be placed in a second condition wherein said ball is not retained when the weapon is released;
   a plate having an aperture therethrough;
   a housing, slidably extending through said aperture, having a lower end fixedly secured to said grasping means and an upper end provided with a flange having a diameter larger than said aperture;
   bias means disposed between said plate and said grasping means for urging said grasping means away from said plate to thereby urge said ball into forceful contact with a suspended weapon; and
   control means disposed within said housing and operatively engageable with said grasping means for selectively placing said grasping means in said first or second condition.

3. An arming unit according to claim 2 wherein said grasping means includes:
   a jaw housing;
   a pair of juxtaposed jaws pivotally mounted within said jaw housing; and
   a pair of parallel springs interconnecting said jaws above their respective pivot axes.

4. An arming unit according to claim 3 wherein said control means includes:
   a plunger disposed within the lower end of said housing for movement between a retracted position wherein said plunger is positioned within the housing and an extended position wherein said plunger is positioned between said jaws to thereby prevent pivotal motion thereof; and
   a solenoid disposed within said housing and operatively connected to said plunger to move said plunger between the retracted position and the extended position.

* * * * *